H. VERRAN AND A. R. GROETZ.
ADVERTISING DEVICE.
APPLICATION FILED MAR. 10, 1919.
1,321,863.
Patented Nov. 18, 1919.
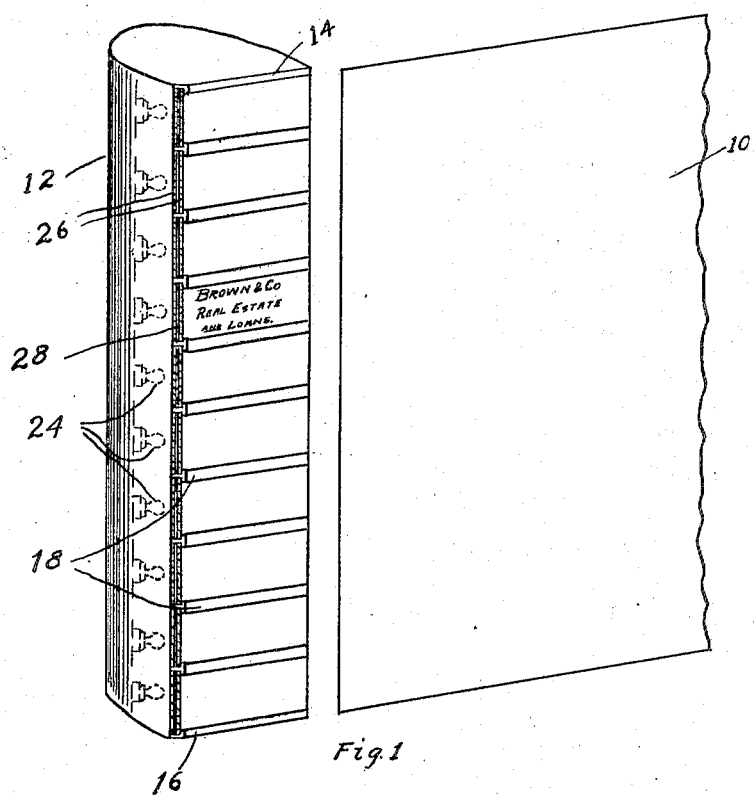
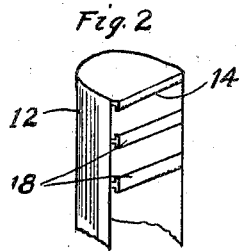
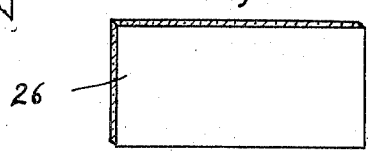
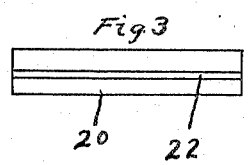
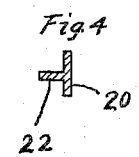
Inventors
Harry Verran
Alfred R. Groetz
By Whiteley and Ruckman
Their Attorneys.

UNITED STATES PATENT OFFICE.

HARRY VERRAN AND ALFRED R. GROETZ, OF MINNEAPOLIS, MINNESOTA.

ADVERTISING DEVICE.

1,321,863.　　　　　Specification of Letters Patent.　　Patented Nov. 18, 1919.

Application filed March 10, 1919.　Serial No. 281,752.

*To all whom it may concern:*

Be it known that we, HARRY VERRAN and ALFRED R. GROETZ, citizens of the United States, residing at Minneapolis, in the county of Hennepin and State of Minnesota, have invented certain new and useful Improvements in Advertising Devices, of which the following is a specification.

Our invention relates to advertising devices and has for an object the provision of an arrangement for displaying advertisements in connection with motion picture screens in which the advertisements, instead of being projected upon the screen as usual, are displayed adjacent the sides of the screen. In this manner the use of the screen for exhibiting motion pictures need never be interrupted and the advertisements are in full view of the audience during the entire exhibition with an assurance that at least a majority of the persons in the audience will, at some time before they leave, read the advertisement. The members of the audience may look at the advertisement at their own convenience, and, since the display of the pictures is not interrupted to display advertisements, the persons composing the audience will not get the unfavorable impression which is at present produced by having the advertisements forced upon them to the exclusion of the pictures during the time that the advertisements are projected upon the screen. Another object is to provide advertising slides which may be cheaply and readily changed as often as it is desired to display new advertisements.

The full objects and advantages of our invention will appear in connection with the detailed description and the novel features embodied in our inventive idea are particularly pointed out in the claim.

Referring to the drawings,—

Figure 1 is a view in perspective of a slide holder and a portion of a motion picture screen. Fig. 2 is a detail view of a portion of a slide holder. Fig. 3 is an inside front view of one of the slide supports. Fig. 4 is an end view of one of the slide supports. Fig. 5 is a view of one of the glass slides. Fig. 6 is a view of one of the advertising sheets.

Referring to the construction shown in the drawings, 10 designates a portion of a motion picture screen, at each side of which are placed advertising slide holders which are alike in all respects and hence it is necessary to describe and illustrate only one of them. The slide holder comprises a semi-cylindrical member 12, preferably of sheet metal, curved into the proper shape and provided with a suitable reflecting surface on the inside, as by a coating of white paint. The top and bottom of the holder at the front are provided respectively with downturned and upturned flanges 14 and 16, and intermediate these flanges the front vertical edges are connected by a plurality of T-shaped slide supports 18, each of which has a vertical portion 20 and a horizontal portion 22. There are preferably nine of these slide supports, as shown, so that ten compartments are provided, and back of these compartments are a plurality of lamps 24, such as incandescent electric lamps, preferably one for each compartment and arranged centrally thereof at the rear. It is obvious, however, that the number of compartments and lamps may be varied, as desired. The slides which are employed we consider an essential feature of our invention. Each of these slides is composed of two separate plates 26 of glass or other transparent material, a sheet of paper 28, or similar material, being placed between the two plates. We have discovered that by employing two transparent plates and placing a sheet of paper, or other fabric containing the advertisement between the two plates, the advertisement may be quickly changed and the expense is much less than would be the case if the letters or characters constituting the advertisement were placed directly on a glass plate. The paper may conveniently be composed of translucent material upon which is placed opaque letters, or characters to form the advertisement, but it is obvious that, if desired, the letters might be cut out of a sheet of opaque paper. In either case the lamps at the back of the slides will cause the letters to be readily visible at all times so that the audience may read the advertisement at their leisure, either while the reels are being changed or after they have seen the entire program, or by looking at advertisements to rest the eyes if they become tired and any particular portion of the picture exhibition does not prove of interest.

The operation and advantages of our invention will be apparent from the foregoing description and have already been fully set forth. The advertisement space may be rented for any stated period, such as a week at a time and any advertisement may be quickly changed by removing the two glass plates together with the intermediate sheet of paper at the open end of the slide way. When a new sheet of paper with the desired advertising on it has been substituted for the discarded sheet the composite slide is replaced in the proper compartment. While our advertising device is intended for use particularly at the sides of motion picture screens it is evident that it may be used in other locations.

We claim:

An advertising device comprising a semi-cylindrical casing, inturned flanges at the top and bottom of said casing extending out beyond the vertical edges thereof, T-shaped slide supports attached to said casing extending horizontally in spaced relation between said flanges with their head portions lying in a common vertical plane with said flanges, advertising slides adapted to be inserted and held in place by said slide supports and said flanges, and a source of light located within the curved surface of said casing.

In testimony whereof we hereunto affix our signatures.

HARRY VERRAN.
ALFRED R. GROETZ.